US009422058B2

(12) United States Patent (10) Patent No.: US 9,422,058 B2
Fischer et al. (45) Date of Patent: *Aug. 23, 2016

(54) MODULAR SEAT ACTUATION CONTROL SYSTEM AND COMMUNICATION METHOD

(71) Applicant: Crane Co., Stamford, CT (US)

(72) Inventors: Brian Fischer, Pasadena, CA (US);
Ary Geuvdjelian, Tarzana, CA (US);
Pan Kwok, West Hills, CA (US);
Nicholas Flores, Pico Rivera, CA (US)

(73) Assignee: CRANE CO., Stamford, CT (US)

( * ) Notice: Subject to any disclaimer, the term of this patent is extended or adjusted under 35 U.S.C. 154(b) by 577 days.

This patent is subject to a terminal disclaimer.

(21) Appl. No.: 13/887,254

(22) Filed: May 3, 2013

(65) Prior Publication Data

US 2013/0317704 A1 Nov. 28, 2013

Related U.S. Application Data

(62) Division of application No. 12/780,810, filed on May 14, 2010, now Pat. No. 8,457,846.

(51) Int. Cl.
*H04J 1/16* (2006.01)
*B64D 11/06* (2006.01)
*B60N 2/02* (2006.01)
*A47C 7/62* (2006.01)
*H04L 12/28* (2006.01)

(52) U.S. Cl.
CPC .............. *B64D 11/06* (2013.01); *A47C 7/62* (2013.01); *B60N 2/0224* (2013.01)

(58) Field of Classification Search
USPC ....................................... 370/282, 419, 386
See application file for complete search history.

(56) References Cited

U.S. PATENT DOCUMENTS

| 5,019,759 A | 5/1991 | Takemura et al. |
| 6,194,853 B1 | 2/2001 | Tual et al. |
| 6,259,362 B1 | 7/2001 | Lin |
| 6,356,559 B1 | 3/2002 | Doucette et al. |
| 6,523,417 B1 | 2/2003 | Donahue et al. |

(Continued)

FOREIGN PATENT DOCUMENTS

EP 1 091 079 A2 4/2001

OTHER PUBLICATIONS

International Search Report and Written Opinion of the International Searching Authority, dated Aug. 18, 2011, for International Application No. PCT/US2011/036139, 11 pages.

*Primary Examiner* — John Pezzlo
(74) *Attorney, Agent, or Firm* — Lewis Roca Rothgerber Christie LLP

(57) ABSTRACT

A seat actuation control system includes at least one seat having a plurality of seat devices and a plurality of control modules interconnected over a communication bus. Each module is associated with a corresponding seat control device and is configured to control its corresponding seat device. Each module includes a processor and a memory coupled to the processor and storing program instructions therein which include receiving a status packet from each of the other control modules over the communication bus, processing the status packet for updating the overall system status, and actuating the seat device based on the overall system status. The program instructions further include determining status of the corresponding seat device, generating a status packet including the status information, and broadcasting the status packet to the other modules over the communication bus.

23 Claims, 6 Drawing Sheets

(56) References Cited

U.S. PATENT DOCUMENTS

| | | |
|---|---|---|
| 6,731,088 B2 * | 5/2004 | Nivet .................... B60N 2/0244 297/311 |
| 6,791,949 B1 | 9/2004 | Ryu et al. |
| 6,824,104 B2 | 11/2004 | Smallhorn |
| 6,934,137 B2 | 8/2005 | Elliott et al. |
| 7,002,457 B2 | 2/2006 | Stevenson et al. |
| 7,289,446 B2 | 10/2007 | Itoi |
| 7,350,866 B2 | 4/2008 | Billger et al. |
| 7,365,449 B2 | 4/2008 | Marin-Martinod et al. |
| 7,650,205 B2 * | 1/2010 | Calcagno ............... G05B 19/42 318/568.1 |
| 7,712,831 B2 | 5/2010 | Abt et al. |
| 2003/0098661 A1 | 5/2003 | Stewart-Smith |
| 2003/0168316 A1 * | 9/2003 | Knepple ................ B65G 37/02 198/460.1 |
| 2003/0194967 A1 | 10/2003 | Sanford et al. |
| 2005/0007964 A1 | 1/2005 | Falco et al. |
| 2005/0120079 A1 * | 6/2005 | Anderson ......... H04L 29/06027 709/203 |
| 2006/0004505 A1 | 1/2006 | Christiansen et al. |
| 2006/0155429 A1 | 7/2006 | Boone et al. |
| 2008/0009989 A1 | 1/2008 | Kim et al. |
| 2012/0173089 A1 | 7/2012 | Maeda et al. |

\* cited by examiner

MODULAR SEAT ACTUATION CONTROL SYSTEM AND COMMUNICATION METHOD

CROSS-REFERENCE TO RELATED APPLICATIONS

This is a divisional application of U.S. patent application Ser. No. 12/780,810, filed on May 14, 2010, the entire content of which is incorporated herein by reference.

BACKGROUND

The present application generally relates to actuated seats, and more particularly, to a seat actuation control system for aircraft seats and a communication protocol used in such control system.

Modern airplane seats, and in particular, seats in the premium sections of passenger airplane are powered and adjustable between a number of seating positions. Some seats may be adjustable from an upright position to a reclined position, while others can recline to a substantially flat position in order to function as a bed. Additionally, some airplane seats have a head rest and a foot rest that can be adjusted to provide a comfortable seating position. The various adjustable features of the seat are accessible and controllable with a passenger control unit, which may be a keyboard with a display. The passenger control unit may also provide the passenger with the ability to adjust the environmental conditions around the seat, such as lighting, temperature and the like. Furthermore, the passenger control unit can allow the passenger to operate various entertainment devices and features associated with the seat, such as a display screen for viewing movies.

FIG. 1 illustrates a powered seat with a typical seat operating system including a passenger control unit such as a keypad 104, a controller 106 and several actuators or other devices 108A-H. A passenger (not shown) sitting in the seat uses the keypad to adjust the seat position and associated devices. The keypad communicates with the controller which, in turn, controls the actuators. The seat controller drives the actuators which control various aspects of the seat. For example, an actuator 108D moves leg rest 110 that moves from a substantially vertical retracted position to a substantially horizontal, extended position. An actuator 108E moves a foot rest 112, that moves from a substantially extended to a substantially retracted position. An actuator 108A moves the reclining back rest 114 that moves from a substantially vertical position to a substantially horizontal position. An actuator 108C moves the seat pan 116. An actuator 108H moves the privacy screen 118. A lumbar controller 108B drives/controls the lumbar bladder 120. In addition, each actuator may include one or more position determining components such as a transducer or sensor (not shown).

A variety of devices may be associated with a seat. For example, by using the passenger control unit, a passenger may control cabin lighting 108F, video systems 108G, audio systems (not shown) or other devices. For convenience, a device associated with a seat such as an actuator or another device or component mentioned herein may be referred to in the discussion that follows as a "seat device."

In a conventional seat control system, all processing is performed in a main controller, such as the controller 106 of FIG. 1. The controller thus directly controls the operation of each actuator or other devices. For example, the controller generates control signals for each actuator and other devices and sends these signals to each actuator/device via separate connection leads. In addition, any signals from sensors in the actuators are sent directly back to the controller. A relatively substantial amount of wiring is used to connect the components.

In other conventional seat control systems (not shown), an actuator controller is incorporated into each actuator assembly. A main controller may coordinate the operation and position of all of the actuators. To this end, the main controller sends commands to each actuator controller over a common serial bus to accomplish the desired actuation. Through the use of a common serial bus, the amount of wiring associated with the seat controller may be reduced. Each actuator controller controls the position of an associated actuator based on commands from the main controller. In response to a command for a given actuator, a corresponding actuator controller generates, within the actuator assembly, actuation signals for that actuator. Signals from sensors in an actuator are sent to the associated actuator controller in the actuator assembly. The actuator controller may use these sensor signals to verify the movement or position of the actuator.

The main controller may perform various functions in addition to the motion control functions described above. For example, the main controller may include a user interface (HMI), communication management, power management and test (e.g., built-in test equipment) functionality. The actuator controller may perform various functions relating to the motion control functions described above. For example, the actuator controller may include a motor driver, actuator jam and short circuit control functionality and electronic clutch abuse control functionality. In addition, the actuator controller may include communication and test (e.g., built-in test equipment) functionality.

In both of the above-described systems, because the location of the main controller may be far from some or all the actuators, the amount of wire used to connect the controller to the actuators may be excessive. The entire system fails to function if the main controller malfunctions or becomes inoperative. System response depends on generation of commands from the master controller to the actuators and receipt of feedback from the actuators by the master controller. Accordingly, for systems with a large number of seat devices, system response may be slow.

Based on the above, there is a need for an operating or control system for a vehicle seat that provides improved wiring, speed, efficiency, modularity and upgradeability.

SUMMARY

According to aspects of the disclosure, a seat actuation control system includes at least one seat having a plurality of seat devices and a plurality of control modules interconnected over a communication bus. Each module is associated with a corresponding seat control device and is configured to control its corresponding seat device. Each module includes a processor and a memory coupled to the processor and storing program instructions therein. The processor is operable to execute the program instructions that include receiving a status packet from each of the other control modules over the communication bus, processing the status packets for determining overall status of the system, and actuating the seat device based on the overall status of the system.

According to aspects of the disclosure, a seat actuation control system includes a plurality of seats, each seat having a plurality of seat devices, a communication bus, and a plurality of control modules interconnected with the communication bus. Each module is associated with a corresponding seat control device and is configured to control its corresponding seat device. Each module includes a computer-usable medium having computer readable instructions stored thereon for execution by a processor. The computer readable instructions include generating data packets including status information of the corresponding seat device, each data packet including priority information for the data packet relative to the priority information of other data packets, and broadcasting the data packets over the communication bus at least partially based on the priority information of the data packets.

According to aspects of the disclosure, a method of actuating a control system having at least one seat having a plurality of seat devices, a communication bus, and a plurality of control modules interconnected with the communication bus, includes broadcasting by one of the modules a status packet over the communication bus for receipt by the other modules, the status packet including status information of a corresponding seat control device of the module, determining the overall status of the system based on the received status packets, and based on the overall status of the system, operating the seat device from the current state to the target state.

According to aspects of the disclosure, a method for peer-to-peer communication between a plurality of modules of a vehicle seat network, where each module is configured to control a corresponding seat device, includes monitoring by each of the plurality of modules a transmit sequence for determining whether the module is a next module in the sequence, in response to determining by one of the modules that the module is the next module in the transmit sequence, generating by the module a status packet including status information of the corresponding seat device, monitoring by the module expiration of a rest period, and in response to expiration of the rest period, broadcasting by the module the generated status packet over the vehicle seat network for receipt by other ones of the plurality of modules for actuating one or more seat devices.

DETAILED DESCRIPTION

Figure 1:
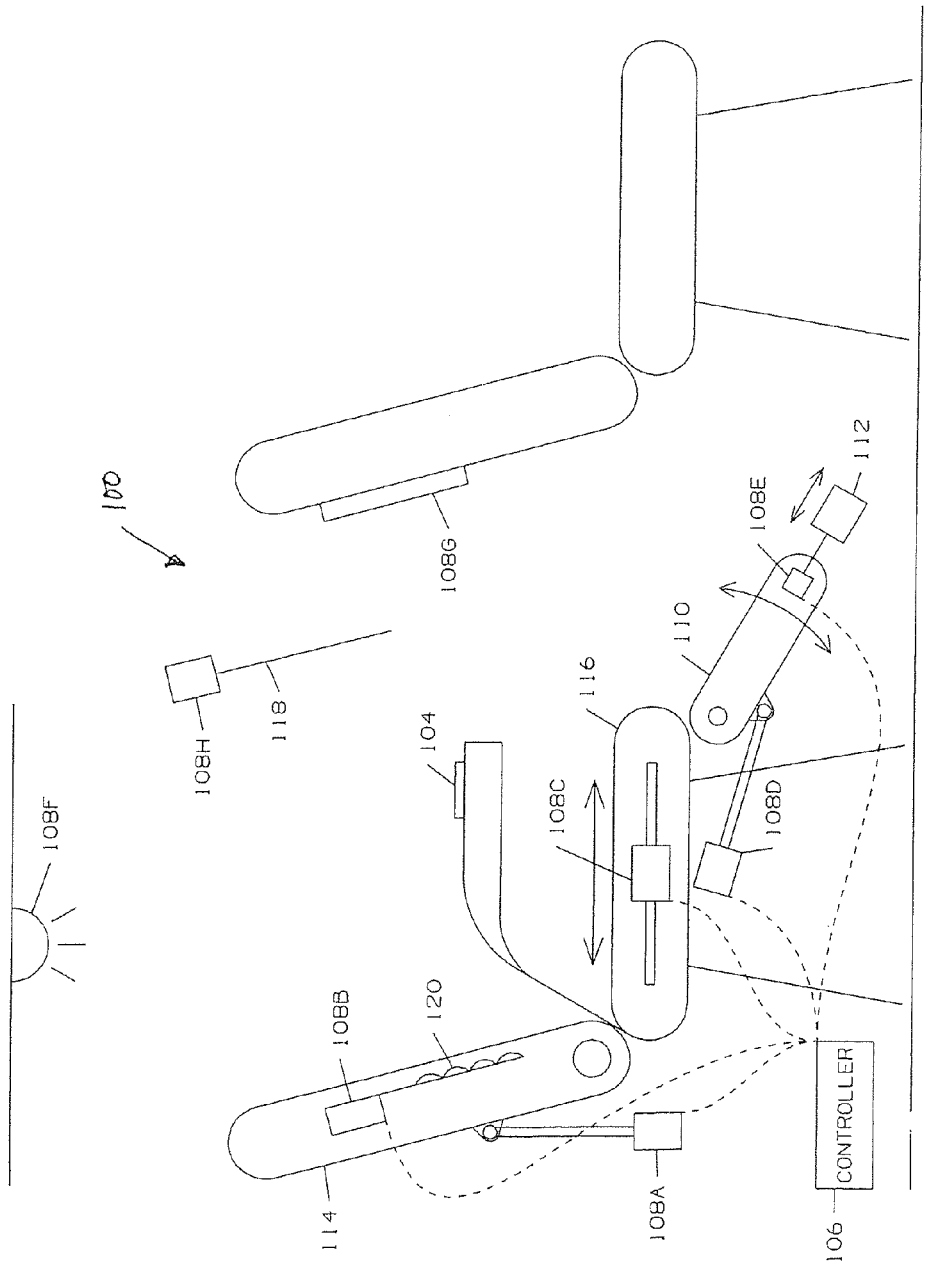
FIG. 1 shows a conventional aircraft passenger seat and control system.
Figure 2:
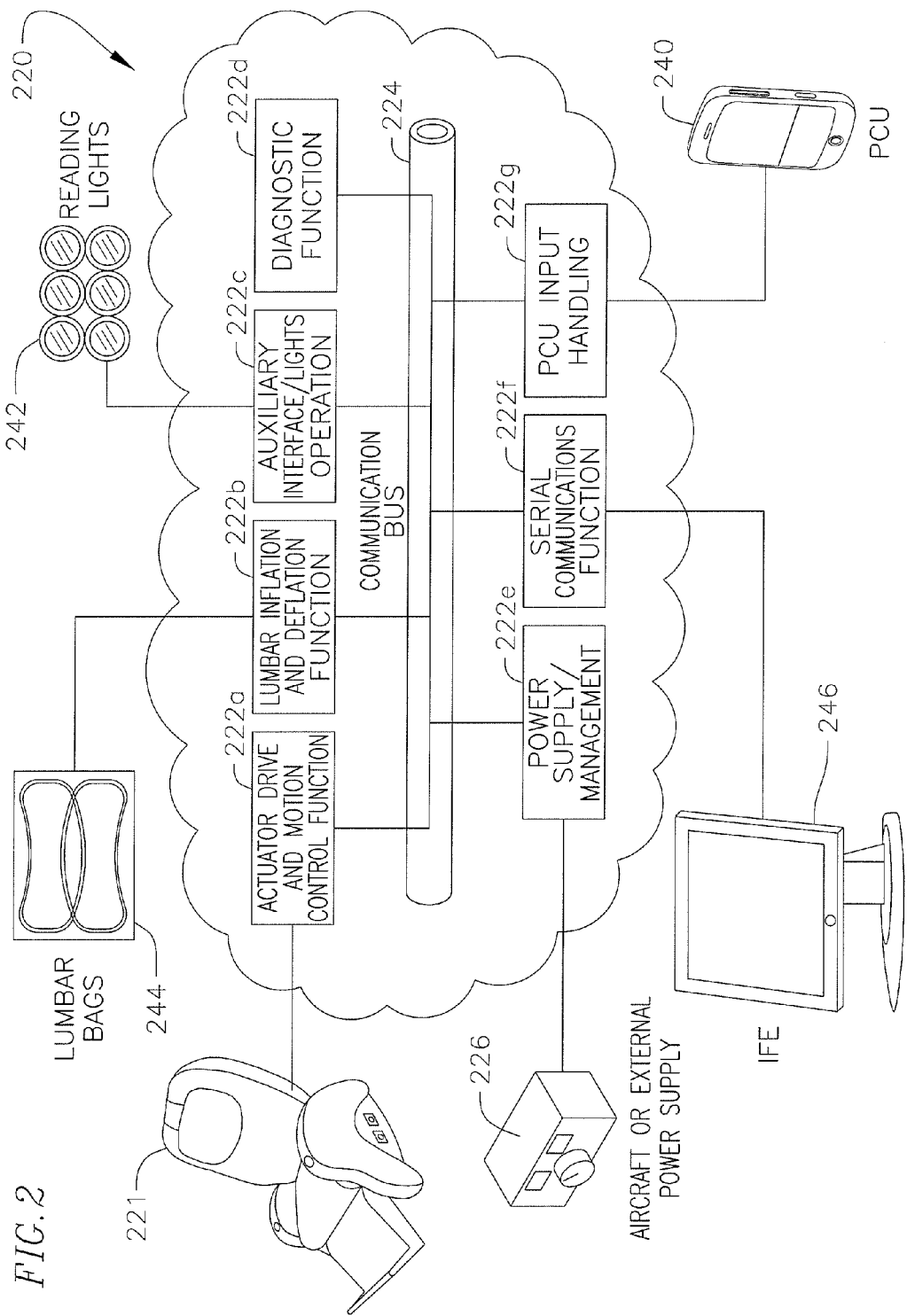
FIG. 2 is a schematic functional diagram of a seat actuation control system according to the disclosure.

Referring to FIG. 2, a functional block diagram of a modular seat actuation control system 220 according to the present disclosure is shown. The seat actuation control system 220 is an electromechanical control system that uses a peer-to-peer network (also referred to herein as "the network") to control seat devices associated with one or more seats 221. The control system 220 includes a plurality of modules 222a-222g (collectively referenced as 222) that are interconnected via a communication bus 224 for broadcasting status messages from one seat module associated with a seat 221, to all other seat modules on the same network. Each module 222 is a line replaceable unit (i.e., a unit having common input/output interfaces for quick replacement on site with another unit) that is connected to an associated seat device, and includes hardware and software to autonomously and independently control its associated seat device. A particular seat device might include one or more moveable parts of the seat such as, for example, a back rest, foot rest, and/or head rest. According to one embodiment, the modules 222 broadcast their status information at configurable time intervals on the bus 224 without sending any commands to the other modules. Upon receiving the broadcast status information, each module determines whether the status information is relevant to it, and if so, whether an action should be taken based on the overall seat status. Each module then internally generates commands to take required action based on the status information. Thus, as described in detail below, each module is autonomous and independently controls the function of its seat device with only the status information broadcast on the network by the other modules, without sending and/or receiving any commands to the other modules and without receiving commands from a central controller. Instead, all processing and computations relevant to actuating a seat device are distributed among all the seat modules and performed internally by the modules themselves. The modular seat actuation control system 220 and communication method described herein can be used for aircraft seats, automobile seats, massage chairs, or any other seat that uses electrical power to operate and/or control one or more functions of the seat. In the following, the seat actuation control system 220 is described for use in passenger aircraft.

The modules 222 communicate with one another via the communication bus 224 and receive power from a power bus (not shown). In the disclosed embodiments, the communication bus 224 is a serial digital communication bus that uses the Controller Area Network (CAN) standard. Accordingly, the communication bus 224 is referred to herein as the CAN bus 224. However, the network can be implemented based on various communications mechanisms such as "Ethernet", RS-485, infrared, or radio frequency communications system, as long as sufficient bandwidth and interconnection of multiple modules can be provided for operation of the control system 220 as described herein. The power may be originally supplied from an external power source 226 and down-converted for propagation from module to module through a power harness.

According to one embodiment, the modules may include one or more actuator modules 222a, lumbar modules 222b, auxiliary interface/lighting modules 222c, diagnostic modules 222d, power supply/management modules 222e, in-flight entertainment (IFE) (or serial communication) modules 222f, passenger control unit (PCU) modules 222g, and the like. Each module interfaces with an associated seat device. The actuator modules 222a are configured to control and operate surfaces or movable seat parts such as a back rest, a seat cushion, a leg rest, an arm rest(s) and/or a foot rest. Each actuator module is electrically powered and includes integrated electronics for power management, motion control, and position feedback. Each actuator module may be a full-size rotary, a compact rotary, a full-size thru-shaft linear, a full-size extension-shaft linear, or a compact extension-shaft linear, depending on the application for which the actuator is used. For example, a rotary-type actuator can be used to recline the backrest, while a linear-type actuator can be used for extending and retracting the leg rest.

In the disclosed embodiments, the power supply module 222e receives an input power from an external source, such as the aircraft power supply, and propagates a down-converted external power to the other modules in the network. The power supply module 222e can turn on and off the power to the network. Allocation of power to the modules 222 is controlled by the modules themselves based on a configurable power allocation priority list, which defines how the modules react when excessive power consumption levels are reached. The power allocation priority list is stored in each module and can be retrieved in order to determine whether power consumption should be reduced. Each module determines whether it should reduce or increase its own power consumption based on the priority of its function(s) relative to functions of the other modules. For example, an actuator module may determine that it must reduce the speed by which it is driving the actuator motor to save power. If power consumption in the system is still excessive, the lumbar module may decide to shut off the pump used to run a massage sequence so that more power can be used by the actuator module or other modules that have a higher priority.

The PCU module 222g can interface with one or more passenger control units 240 that may include keypad switches for receiving passenger input. The lighting module 222c can operate one or more lights 242 such as reading lights, auxiliary/mood lights, foot well light, dome light, floor light, desk light, mini bar light, and taxi, takeoff and landing (TTL) indicator light, or other auxiliary devices. The lumbar module 222b provides back support to an occupant and may include a lumbar pump, pneumatic manifolds, solenoid valves, and electronics, which inflate and deflate lumbar bags 244. The in-flight entertainment module 222f may include a display screen 246 with touch-screen capability for displaying movies, games or other visual and/or interactive entertainment to a passenger. The diagnostic module (not shown) provides service personnel access to diagnostic information for the entire system. Each seat may include more than one of the above-noted modules. The diagnostic module 222d monitors the network traffic, and displays real time information about current status of the seat (which can be used to diagnose problems on the seat). The diagnostic module also displays a list (with timestamps) of error conditions that have occurred recently as well as a detailed history of critical errors that have occurred over the lifetime of the seat. Additional modules can be added to the network to support additional functionality.

The modular control system 220 may control more than one seat, with each seat having more than one module. The modules of the control system 220 independently and autonomously provide actuation and control of their associated movable seat parts; synchronize transitions from a current position to any preset position defined by the occupant, such as TTL, Dine, Lounge, or Sleep/Bed position; fix obstruction avoidance through continuous monitoring of present actuator positions and comparison of these positions with predefined forbidden zones; control power delivery to IFE equipment such as occupant provided devices (e.g. portable audio/video devices), and other occupant related accessories; and also provide built-in test capability by, for example, continuous monitoring of hardware and software used for the seat. Each module may control more than one seat device. For example, a PCU module may support two PCU's, such that each PCU functions in the network as unique module and may broadcast separate status information. In another example, an actuator for a privacy screen can be controlled by two different seats.

Figure 3:
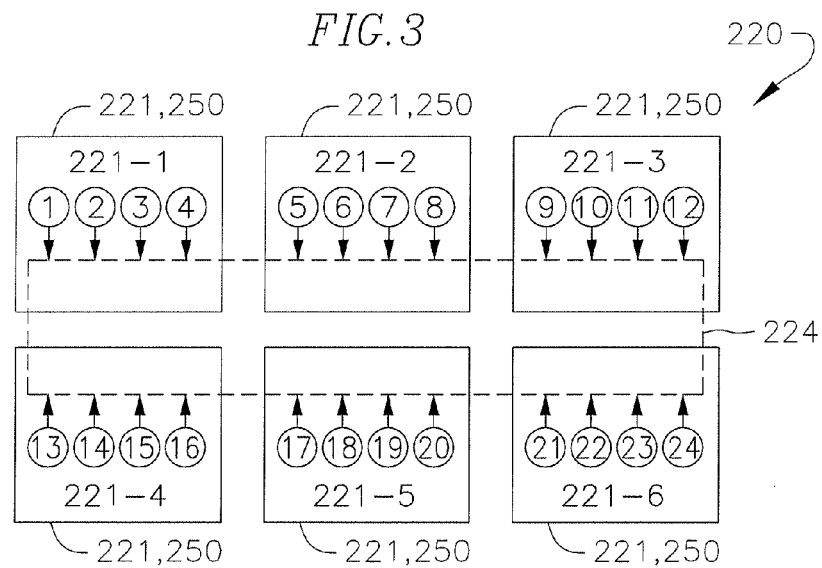
FIG. 3 is a schematic diagram of a plurality of aircraft seats with each seat including a plurality of control modules according to the disclosure.

Referring to FIG. 3, a schematic diagram of the seat control system 220 is shown having multiple seats. In the example of FIG. 3, the control system 220 includes six seats 221-1 through 221-6 and each seat includes four modules (each modules represented with a circle). However, any number of seats 221 having any number of modules can be included in the control system 220. Each seat 221 and its modules define a sub-network 250. Each sub-network includes modules that control different functions of the seat as described above. As described in detail below, the control system 220 uses seat identifiers in order to identify a particular sub-network 250 or seat 221 and uses module identifiers in order to identify a particular module. For example, each seat may be assigned a numerical identifier. In FIG. 3, seats 221 or sub-networks 250 ranging from 221-1 through 221-6 are shown. Each module may also be assigned a numerical identifier. In FIG. 3, modules 1-24 are shown. The numerical identifier of a module can be unique according to the function of the module and may not change from seat to seat. For example, the lumber module may be represented by module ID 5. Accordingly, every lumbar module of every seat can be represented by module ID 5. Therefore, the modules are uniquely identified based on combination of seat ID and module ID.

Figure 4:
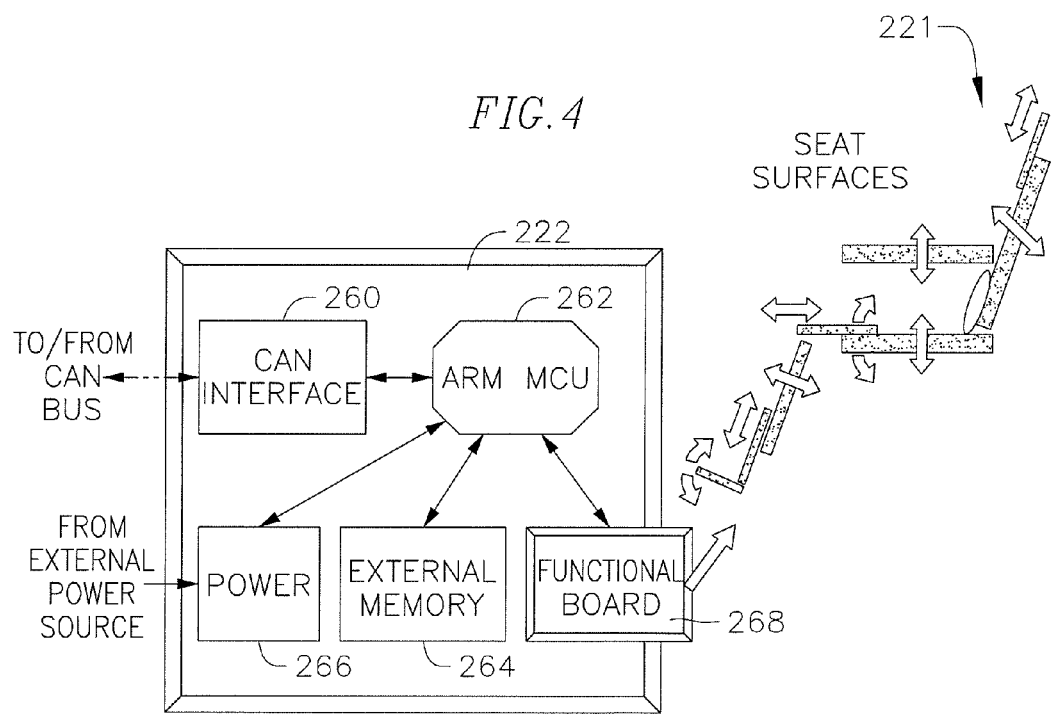
FIG. 4 is a schematic diagram of a control module according to the disclosure.

Referring to FIG. 4, a schematic diagram of an exemplary module 222 is shown. The module 222 includes a CAN interface 260 that facilitates communication between the module 222 and the CAN bus 224. A micro controller unit (MCU) 262 is connected to the interface 260 in order to process the status information received from the other modules 20, perform various computations that may be required in order to control the module's corresponding seat device, manage the operations of the other components of the module, and prepare status information to be broadcast to the other modules with the CAN interface 260 through the CAN bus 224. The MCU 262 may be any type of controller/processor that can provide the functions described herein. In the disclosed embodiments, the MCU 262 is a micro ARM processor.

The MCU 262 communicates with external memory 264, which may be flash-type memory, in order to load into its main memory, software that may be stored in the external memory and that is required for various operations and computations of the MCU 262. The loaded software may be executable program code and data with configuration parameters that are specific to the particular module, and which are then invoked to perform computations relevant to the module in response to status packets from the other modules. The software downloaded to memory includes computer program instructions to execute the various functionalities of the module as disclosed herein. Such computer program instructions may include executing a mathematical algorithm for operating a corresponding seat device based on the overall system status. For example, the status information may include the last position of certain seat devices controlled by the other modules. The position of one or more of the modules may be an input parameter to the mathematical algorithm of a current module for computing an output (e.g., a target state). The MCU may then operate and control the corresponding seat device from a current state to the target state based on the computed output. The MCU may further store and retrieve additional data generated by the MCU to and from the memory 264. Power is provided to the module 222 and the MCU 262 via a power unit 266.

The MCU 262 also controls a function board 268, which is operated by the MCU 262 and operates the corresponding seat device of the module 222. For example, the PCU module's MCU 262 will sample signals from the function board 268 and determine which key is pressed. Each module may additionally include LED indicators (not shown) for status and diagnostic purposes.

According to one embodiment, the modular control system 220 uses a communication protocol to provide peer-to-peer communication between the modules within each sub-network and the modules of different sub-networks. Although the present embodiments describe the communication protocol in the context of a peer-to-peer vehicle seat network, a person of skill in the art should recognize that the communication protocol may also be used to support additional automation and control tasks. Communication messages on the CAN bus 224 are in the form of data packets, which may have any predetermined format. In the disclosed embodiments, each packet includes a message header and message data portion. Both the header and the message portion can have any bit length in order to provide the functionality described without sacrificing computing speed, data storage requirements, and data transmission speed. In the disclosed embodiments, the header is 29 bits and the message portion is 64 bits.

Different types of packets can be defined based on a priority of the data packets. In the disclosed embodiments, the priority of each packet represents the urgency for broadcasting the data packet through the network relative to other types of packets. According to one embodiment, the communication protocol is defined by three types of packets, namely, heartbeat packets, staggered packets, and asynchronous packets. The format of the header is the same regardless of the type of communication packet, but the format of the message body varies depending on the packet type. Additional packet types may also be defined for other types of priorities. Accordingly, the control system 220 can accommodate any number of packet types with different priorities should such a need arise as a result of system modification or expansion. For example, as shown in TABLE 1, up to eight different types of packets can be defined having different levels of priority.

TABLE 1

| Priority | Intended Use |
| --- | --- |
| 0 | Reserved for Future Use |
| 1 | Asynchronous Packet |
| 2 | Reserved for Future Use |
| 3 | Heartbeat |
| 4 | Reserved for Future Use |
| 5 | Staggered Packets |
| 6 | Reserved for Future Use |
| 7 | Reserved for Future Use |

The format of the data in the data packets and the priority of the packets is defined by the header. Referring to TABLE 2, the header includes a message priority field, which indicates the priority of the message for broadcast through the CAN bus 224. Messages with a lower message priority number will have a higher priority if there is a message collision on the CAN bus.

TABLE 2

| Message Priority | Message Acknowledge Request | Message To Seat ID | Message To Module ID | Message From Seat ID | Message From Module ID | Message ID |
| --- | --- | --- | --- | --- | --- | --- |
| 3 bits | 1 bit | 4 bits | 5 bits | 4 bits | 5 bits | 7 bits |

The header includes a message acknowledge request field, by which acknowledgement can be requested from the recipient module. This field includes a one bit flag that indicates whether the sender of the message requested an acknowledgement packet specifically from the recipient packet. If the message is broadcast to multiple or all modules and the acknowledgement bit is 1, then all recipient modules will respond with their acknowledgement. The acknowledgement bit can be used to monitor the health of the network and operational status of the other modules.

The "message to seat ID" field indicates for which seat the message is intended. As described below, certain data packets broadcast on the CAN bus may be global packets and others may be intended for specific seats and/or modules. As described above, each seat or sub-network can be identified by a numerical identifier. For example, in the embodiment of FIG. 3, the number 3 in the message to seat ID field would indicate that the message is intended for seat no. 3. If a message is intended for all of the seats or sub-networks (i.e., a global packet), then the number in the field could be set to one number higher than the total number of seats. For example, in the embodiment of FIG. 3, the number 7 in this field would become a global message and indicate that the message is for all of the seats.

The "message to module ID" field indicates for which module the message is intended. As described below, certain data packets broadcast on the CAN bus may be global packets and others may be intended for specific seats and/or modules. As described above, each module can be identified by a numerical identifier. For example, in the embodiment of FIG. 3, a number 10 in the message to module ID field would indicate that the message is intended for module no. 10. If a message is intended for all of the modules, then the number in the field could be set to one number higher than the total number of modules. For example, in the embodiment of FIG. 3, the number 25 in the message to module ID field would become a global message and indicate that the message is for all of the modules. The message from seat ID indicates from which seat the message originated, and the message from module ID indicates from which module the message originated. The message ID field identifies the type of message being broadcast, which may be predefined based on the types of messages communicated in the control system.

As discussed above, the message portion of the packet can include any number of packet types. In the disclosed embodiments, the packet types include heartbeat packets, staggered packets and asynchronous packets. Heartbeat packets are the main source of status information for each module and are broadcast at discrete time intervals after an initialization of the network as described in detail below. The data message part of each module's heartbeat packet contains status information about that module. The status information is received by the other modules and used to determine whether an action is necessary by each recipient module. The message data fields of the heartbeat packets for the modules may be similar or vary depending on the function of the module. The message data fields of each heartbeat packet may include data regarding the seat device controlled by the module. For example, for the modules that control the seat actuators, the message data fields of the heartbeat packet may include status information such as position of the associated actuator, current operational status (i.e., on or off), initial and target positions, information regarding whether the target position has been reached, and/or estimated time for an action to complete. TABLE 3 shows an example of the contents of heartbeat message data for an actuator module. In the example shown in TABLE 3, the message data fields include actuator module status, actuator position, actuator motor current, pulse width modulation status, actuator brake status, status of H-Bridges 1 and 2 for controlling motor direction, motor inverted status, virtual track motion active status (i.e., calculation of seat motion waypoints between initial position and target position by a seat motion algorithm), and actuator status. TABLE 3 is an example of the heartbeat message data for an actuator module. The heartbeat message data is not limited to the example shown in TABLE 3 and can include any number of parameters, parameter ranges, bit lengths and additional information. In another example, for the module that controls the PCU, the message date fields of the heartbeat packet may include information regarding status of different keys on the PCU.

TABLE 3

| Parameter | Range | Total Bits | Additional Info |
| --- | --- | --- | --- |
| Module Status | 0-7 | 3 bits | |
| Position | 0-999 | 10 bits | |
| Current | 0-8192 | 13 bits | |
| Pulse width modulation | 0-100 | 7 bits | |
| Brake Status | 0-1 | 1 bit | 0 = Off<br>1 = On |
| H-Bridge #2 Enabled | 0-1 | 1 bit | 0 = Off<br>1 = On |
| H-Bridge #1 Enabled | 0-1 | 1 bit | 0 = Off<br>1 = On |
| Motor Inverted | 0-1 | 1 bit | 0 = Not Inverted<br>1 = Inverted |
| Virtual Track Motion Active | 0-1 | 1 bit | 0 = False<br>1 = True |
| Waypoint Position Achieved | 0-1 | 1 bit | 0 = False<br>1 = True |
| Actuator Status | 0-1023 | 10 bits | |

Each module on the network broadcasts a heartbeat packet. According to one embodiment, the heartbeat packets are broadcast in a round robin, sequential order. The sequence may be in any order. In the disclosed embodiments, the lowest module identifier has priority to report first. If multiple seats are defined on the network containing the same module identification, then the seat with the lowest seat identifier reports its heartbeat first. Thus, for a system such as the one shown in FIG. 3, the heartbeat reporting sequence is 1, 2, 3, 4, 5, 6. Each heartbeat packet is broadcast at discrete time intervals such that a configurable minimum "resting period" is provided between the broadcast of heartbeat packets. This rest period prevents the network from becoming saturated with handling heartbeat packets. Furthermore, the rest period allows the modules on the network to handle higher or lower priority messages than the heartbeat packets to be broadcast throughout the network.

Figure 5:
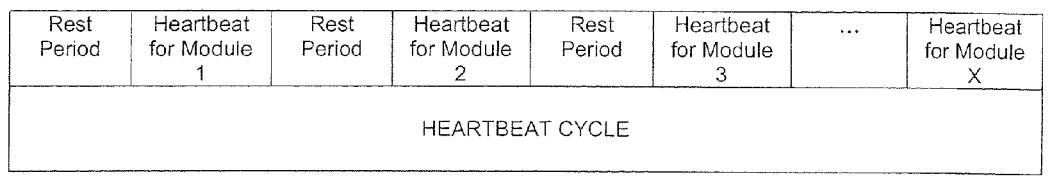
FIG. 5 is a schematic diagram illustrating a heartbeat cycle for transmitting data from modules according to the disclosure.

Referring to FIG. 5, a heartbeat cycle is shown, which can be defined as a complete sequence of heartbeat packets on the network. Accordingly, the heartbeat cycle repeats after all of the modules have broadcast heartbeat packets. Between each heartbeat packet broadcast, the rest period is provided which as described in more detail below provides a window for broadcasting the other types of data packets. A configurable period can be defined for each heartbeat so as to allow for a delay in a module broadcasting a heartbeat packet. The network includes a configurable defined heartbeat timeout period. If the current module does not report its heartbeat within the timeout period, the other modules will consider the current module as not communicating and will move to the next module. The network also includes a configurable heartbeat cycle timeout period, during which the network monitors whether each module had an opportunity to broadcast its heartbeat packet. If all of the modules do not report their heartbeat packets within the configurable heartbeat cycle timeout period, then each module monitors and flags this as an error condition. The handling of this error condition is configurable in order to correct the error. Upon receiving the heartbeat packet of the last module in the heartbeat cycle, a timer measuring the cycle timeout period resets.

In order to communicate large amounts of data, such as software upgrades or diagnostic interrogations, the modules communicate with the staggered packets. The data communicated with the staggered packets is not time sensitive such that it is not defined as a part of the heartbeat packets. Due to the low priority of the staggered packets, these packets can be broadcast before a heartbeat packet for each module is broadcast. However, if more staggered packets are to be communicated, the network gives priority to the heartbeat packet and resumes sending the additional staggered packets at the next cycle.

In order to communicate critical, i.e., high priority, information, the modules communicate with the asynchronous packets. An example of high priority or critical information is an error condition due to one or more seat components failing. For example, if an actuator jams during operation, the module for the actuator broadcasts an asynchronous packet reporting the failure of the actuator. Accordingly, one or more of the seat devices may stop their operation upon receiving the asynchronous packet instead of waiting to receive the next heartbeat packet from the module with the jammed actuator in order to obtain system status. Thus, messages broadcast with asynchronous packets may be time sensitive messages. Asynchronous packets can be reported at any time. However, in order to reduce packet collisions, the asynchronous packets can be reported during the heartbeat rest period.

Heartbeat packets and asynchronous packet are typically global messages that are intended for all of the modules. Each module receives and stores in memory the heartbeat packets broadcast from the other modules in order to determine an updated overall status of the system. Asynchronous packets are also typically intended for all of the modules in order for all of the modules to determine whether action should to be taken based on the high priority or time sensitive message included in the asynchronous packets. Staggered packets may include global messages or may include messages directed to particular modules. For example, when a common software stored in all of the modules is to be updated, a global staggered packet, i.e., intended for all of the modules, can be broadcast so that each module can update its own software. In certain situations, the software for a particular module may need to be updated. Accordingly, the module providing the update may broadcast the update with a staggered packet intended for the module that requires the update. Thus, data packets can be global and intended for all of the modules, intended for one or more particular seats including all of the modules for those seats, or intended for one or more particular modules in the network depending on the type of packet being broadcast and the function to be carried out by the module(s) receiving the packet.

Figure 6:
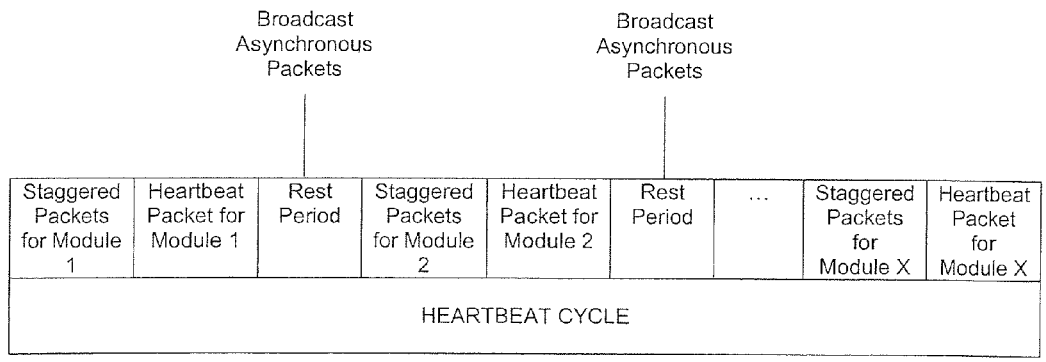
FIG. 6 is another schematic diagram illustrating a heartbeat cycle for transmitting data from modules according to the disclosure.

Referring to FIG. 6, the heartbeat cycle is shown, which compared to FIG. 5, it additionally shows broadcast of staggered packets and asynchronous packets. After a module broadcasts a heartbeat packet, the heartbeat rest period begins. This rest period provides an idle time for the network so as to allow this module or other modules to broadcast asynchronous packets. After the rest period, staggered packets for the next module are transmitted followed by the broadcast of heartbeat packets for the next module. This process is described in more detail below with reference to FIG. 7.

During startup or initialization, the modules synchronize their clocks. During initialization, the software and configuration tables of the modules are validated and the software is updated if necessary. The configuration tables contain all of the parameters that define system operation. For example, the configuration tables may include seat kinematics parameters that define the range of seat motion in order for the seat to avoid obstacles during operation. Such parameters may include ranges for linear and angular motion of various seat parts, permissible speed and acceleration ranges for the motion of such seat parts, and the order by which each seat part is actuated to move the entire seat between different positions. The configuration tables may also include parameters that specify whether various seat preset motions (e.g. TTL, Bed or Taxi position) are enabled. The configuration tables and the software are stored in memory during initialization. The software includes mathematical models of the seat parts. The MCU of each module determines the overall status of the network based on the heartbeat packets received from the network. The MCU then loads the parameters of the configuration tables and relevant data provided by the heartbeat packets (e.g., positions of other seat devices) into the mathematical model and computes seat motion to determine whether the corresponding seat device should be operated to a target state. The updated software and configuration tables for all of the modules may be provided to one or more of the modules and then propagated over the CAN bus to the other modules. For receiving updated information from an external device such as a mobile computer, each module may include a data input device, such as a USB port, a secure digital memory card reader (i.e., micro SD card reader), or other input devices that are used for data transfer to and from an external device. The updated information may also be transferred wirelessly to one or more of the modules. After the initialization step, the modules assume a normal mode and are ready for operation as described herein.

Figure 7:
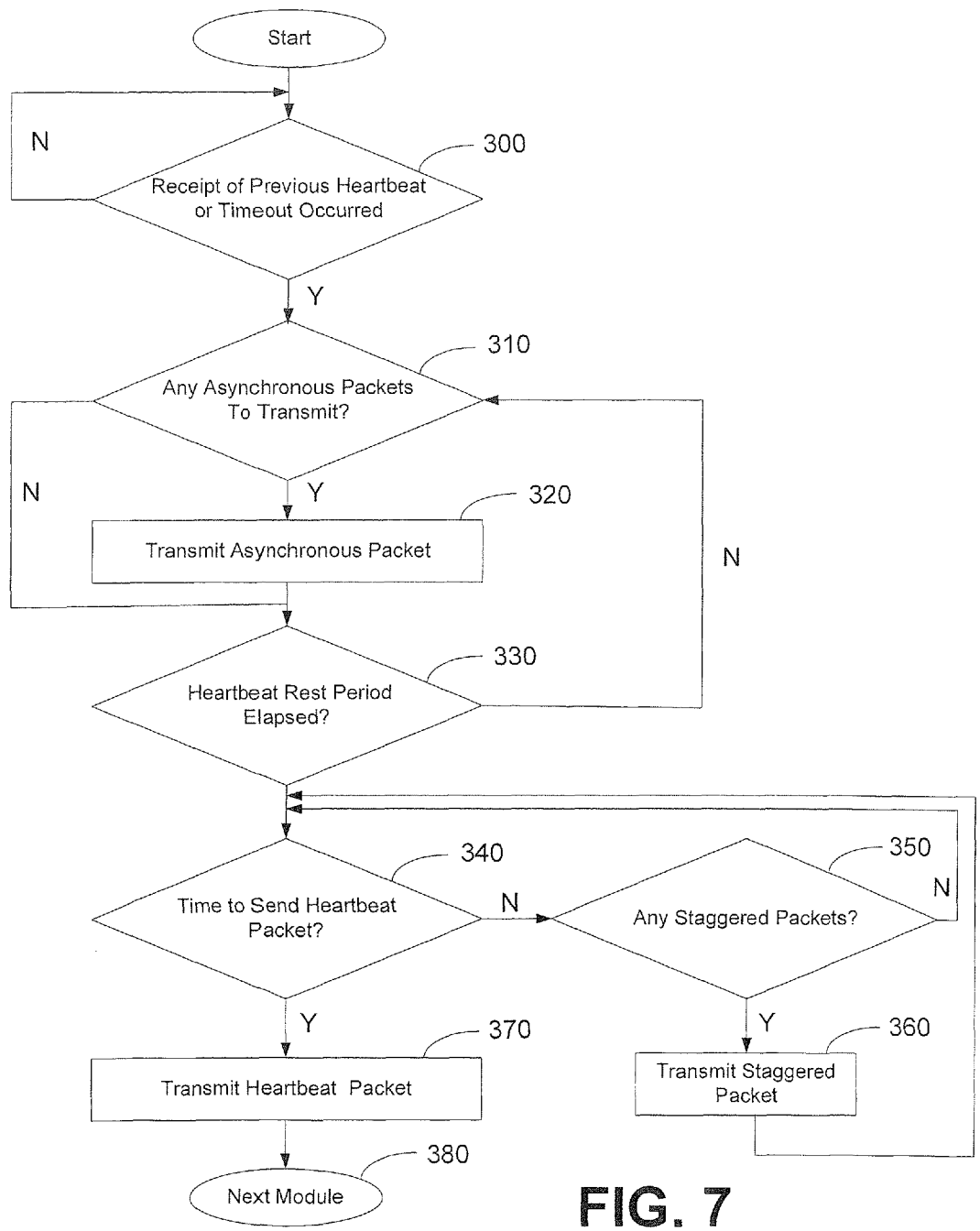
FIG. 7 is a flowchart illustrating operation of an exemplary module according to the disclosure when transmitting data to the other modules.

FIG. 7 is a flow diagram of a process of transmitting the above-described packets by a module. The MCU of each module takes each of the steps described below based on program instructions stored in the memory of the module. Due to information retrieved from the configuration table, the MCU of each module knows its order in the heartbeat cycle relative to the other modules. Furthermore, each module is time-stamp synchronized so as to be able to determine whether the rest period between itself and the last module in the heartbeat cycle is ending or has ended. Accordingly, based the heartbeat cycle order of the modules and the amount of time elapsed after the last module transmitted its status information, the MCU in the module determines at step 300 whether the previous heartbeat was received or whether the heartbeat rest period has ended. At step 310, the MCU determines whether there are asynchronous packets to transmit. If there are no asynchronous packets to transmit, the MCU goes to step 330. However, if there are asynchronous packets to transmit, the MCU broadcasts asynchronous packets at step 320 and then goes to step 330. At step 330, the MCU determines whether the heartbeat rest period has elapsed. If the heartbeat rest period has not elapsed, the MCU returns to step 310. If the heartbeat rest period has elapsed, the MCU determines whether it is time to send a heartbeat packet. If it is time to send a heartbeat packet, the MCU broadcasts a heartbeat packet over the CAN bus at step 370. The process then moves to the next module at step 380. If at step 340 the MCU determines that it is not yet time to send a heartbeat packet, then at step 350 the MCU determines whether there are any staggered packets to broadcast. The staggered packets are broadcast at step 360. If there are no staggered packets to broadcast at step 350 or after broadcasting of a staggered packet at step 360, the MCU returns to step 340. Only the module pending the transmission of a heartbeat packet can broadcast staggered packets. However, any module in the system can broadcast an asynchronous packet at any time. After transmission of a heartbeat packet, the module's turn to broadcast ends and the process moves to the next module in the heartbeat cycle.

In the above description, three types of packets are described having different priorities for transmission through the CAN bus 224. However, the types of packets used for communication within the network is not limited to those described above and may include a large number of packets having different priorities. For example, the control system 220 can include 8 types of packets as shown in TABLE 1 having priority values from 0-7, with the lowest priority number having a highest priority. The control system 220 may include data packets having a higher priority than the asynchronous packets described above. Such very high priority packets may require that all data packet transmissions including heartbeat packet transmissions to be interrupted in order for the very high priority packets to be transmitted. The control system 220 may also include packets having a lower priority than the staggered packets described above. Such very low priority packets can be transmitted, for example, during periods when the activity in the control system 220 is very low. Accordingly, regardless of the number of packet types with differing levels of priority, the transmission of any number of packets can be prioritized and performed while considering the transmission of heartbeat packets for each module based on the heartbeat cycle as described in the exemplary embodiment of FIG. 7.

Figure 8:
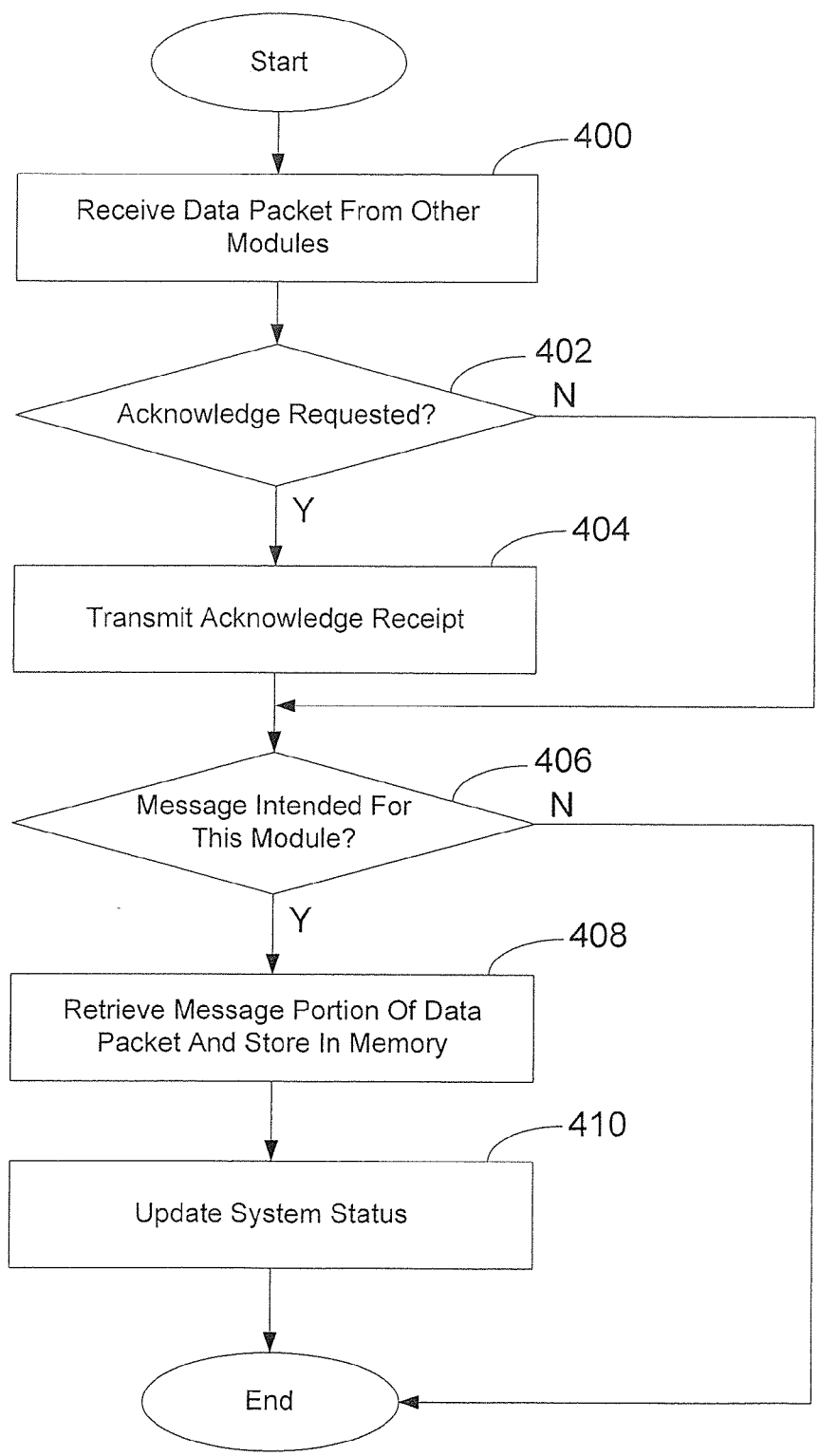
FIG. 8 is a flowchart illustrating operation of an exemplary module according to the disclosure when receiving data from the other modules.

FIG. 8 is a flow diagram of operation of a module upon receiving a packet. At step 400, the MCU in the module receives a packet broadcast through the CAN bus 224 by another module in the same seat or some other seat. Based on data in an acknowledgment field of the header, the MCU determines at step 402 whether an acknowledgement request should be broadcast. If an acknowledgement is required, the MCU sends an acknowledgement receipt at step 404. The MCU further processes the header data to determine, at step 406, whether the message portion of the packet is intended for the module. In this regard, the MCU retrieves the intended recipient's seat and module ID numbers in the header portions to determine if it matches its own seat and module ID numbers, or whether the seat and module number combination indicates that the packet is a global packet and intended for all seats and/or modules. If the module is not the intended recipient of the packet, the MCU ignores the received packet and the operation of the module with respect to the packet ends. However, if the packet is a global packet or the module is the intended recipient of the message in the packet, then the MCU retrieves the message's content at step 408 and saves the contents in memory. If the data packet is a heartbeat packet, the heartbeat data of the transmitting module from the previous heartbeat cycle is discarded (i.e., overwritten in memory by the new heartbeat data). Accordingly, the module receives and stores in memory the updated heartbeat data from all of the modules.

At step 410, the MCU will use the message's contents to update it's internal system status. The updated internal system status of the module provides the module with an update of the overall system status. In other words, the module will know the updated status of all of the modules in the system. Based on the updated system status, the MCU determines whether it should operate its corresponding seat device from the current state to a target state based on the updated system status. Utilizing the configuration tables and the software stored in memory, the MCU can retrieve from memory the updated system data it needs to perform computations regarding operating its seat device from the current state to a target state. For example, the heartbeat data broadcast from the PCU module may indicate that the status of a key on the PCU related to moving the footrest has changed (e.g., passenger wishes to move the footrest). In addition to operating the footrest to a target state based on the updated status of the PCU, the footrest module may also retrieve from memory the updated status of the seat located in front of the foot rest to compute whether a collision may occur during movement of the footrest to the target state. Although FIG. 8 shows that data packets are stored in memory only at step 408, the data packets received by each module can be stored in memory and retrieved from memory by the MCU during and between steps 400-410 in order to perform the operations described above. For example, any data packet received through the CAN bus can be saved in memory between step 400 and 402. Then, for example at step 406, the MCU can retrieve the data packet from memory to determine whether the packet is intended for the module. If the packet is not intended for the module, the data packet can be deleted from memory.

In the following, two specific operational examples are described in detail with reference to FIG. 3. The first example is related to a scenario where movements of a seat may cause contact to the floor or back shell of the seat in front. The second example is related to obstruction of a seat part by a person and avoiding injury to the person.

When a seat is in a flat configuration such that all of the seating/support surface of the seat have been extended to their limits, the space occupied by the seat may encroach into the space that may be occupied by the back shell of the seat located in the front. For example, if a seat is reclined to its limit, the back shell of the seat in front may interfere with the foot rest of the seat behind it if the foot rest is extended to its limit. Accordingly, the back shell and the footrest may collide. As described in the following example, the modules of the present application communicate their status information to each other and autonomously and independently take action to avoid the noted interference and collision. For example, a passenger seated in seat no. 4 (see FIG. 3), may wish to extend the foot rest. Upon initiating the movement of the foot rest, the module associated with the foot rest, which will be referred to as module no. 15, broadcasts a heartbeat packet to the other modules. The heartbeat packet may include the position of the footrest at the time the heartbeat packet was transmitted. Thus, with every subsequent heartbeat packet transmitted by module no. 15, a new and farther extended position of the footrest is broadcast through the CAN bus 224.

In this example, the intended recipient of the message in the heartbeat packet may be all of the modules. Using the stored configurable data in its memory, module no. 15 will compute whether the footrest actuator will collide with the back shell of the seat in front, using the positions of modules 13 through 16 retrieved from its memory. The computations of module no. 15 are based on mathematical algorithms stored in its memory for operating a seat device corresponding to module no. 15 based on received status information of one or more of the other modules. Therefore, each module may receive status information from the other module and independently determine whether any action should be taken. If the passenger of seat no. 4 stops the footrest before such a possible collision, no special action may be taken by any module. However, if the passenger of seat no. 4 continues to extend the footrest, by which the current status of the footrest is broadcast through the CAN bus, and based on its computations that the footrest will collide with the back shell, any module may independently take action to avoid such a collision. For example, module no. 15 may stop the footrest from extending beyond a certain limit to prevent collision with the back shell. Alternatively, module no. 13, which in this example is the recliner module, can recline up while the footrest extends, so that the footrest can move to its limit without contact with the back shell.

In another example, the modules communicate with each other in order to prevent injury to a passenger. The actuators used for moving the seat parts may include force sensors to determine the force exerted on a seat part by an external object. For example, if a passenger initiates a position change for the entire seat with the PCU module, such as a bed or sleep position, all of the seat parts may move together to move the seat from the initial position to the bed position. During such a movement, the modules of the seat broadcast heartbeat packets through the CAN bus in order to keep the other modules apprised of their status. Assuming that the passenger's leg is obstructing the space in which the footrest is to be extended, the foot rest will make contact with the passenger's leg. The foot rest then sends feedback through its actuator to the module which controls the footrest to indicate an obstruction force. If the force is above a certain predefined limit for preventing injury, the module of the footrest may stop the motion of the footrest in order to prevent injury to the passenger. Additionally, the module of the footrest may broadcast a heartbeat packet to the other modules of the seat with its status. The other modules may then take action independently to either stop the repositioning of the seat or modify the repositioning motion of the seat due to the passenger's leg obstructing the footrest. For example, the PCU module can notify the passenger with visual or audio signals regarding the passenger foot obstructing the repositioning of the seat.

The above examples describe a simple interaction and operation between modules. However, in a seat control system with a large number of seats and with each seat having a large number of modules, the operation of each seat device may be influenced by the operation of another seat device with respect to power distribution, power allocation, range of movements of various seating surfaces, interaction between in-flight entertainment devices (e.g., two screens used by different passengers for interactive gaming), privacy screens, lighting interference (e.g., lighting at one seat adjusted so as to not disturb adjacent sleeping passenger), seat positions during TTL, and various other seat operations. Each module includes data and software stored in memory to autonomously and independently compute and accordingly decide a course of action based on the status of other modules regarding the above-noted operational situations.

The disclosed seat actuation control system provides distributed processing and peer-to-peer communication between seat modules. Each module receives status information from the other modules without receiving any commands, such as commands generated by a master or main controller, and independently and autonomously controls its corresponding seat device. Accordingly, because computations and decision making processes for each module are performed in the module by the MCU, the control system provides rapid responses to passenger requests under all operational conditions because the computations are not performed by a single master controller. Additionally, the control system allows modification of the system by upgrading the hardware and software of one or more modules when necessary. The control system also provides easy expansion of the system by adding modules that communicate with the network with the same communication protocol. Failure of one or more modules affects only the failed modules without affecting the operation of the entire system as compared to master-slave control systems where failure of the master controller causes complete system failure.

Although the disclosed control system and the peer-to-peer communication network is discussed with respect to actuated seats, the control system and the peer-to-peer communication network including the network configurations and communication methods and protocols discussed herein can be applied to any type of modular system. For example, any system that includes a number of modules that operate various devices to perform certain functions, and where the functions may be dependent upon the status of the other modules in the system, can use the disclosed communication system to provide system control based on independent and autonomous control by each module.

While a particular form of the disclosure has been illustrated and described, it will be apparent that various modifications can be made without departing from the spirit and scope of the disclosure. Accordingly, it is not intended that the disclosure be limited, except as by the appended claims.

What is claimed is:

1. A method for peer-to-peer communication between a plurality of modules of a vehicle seat network, each module being configured to control a corresponding seat device, the method comprising:
   monitoring by each of the plurality of modules a transmit sequence for determining whether the module is a next module in the sequence;
   in response to determining by one of the modules that the module is the next module in the transmit sequence, generating by the module a status packet including status information of the corresponding seat device;
   monitoring by the module expiration of a rest period; and
   in response to expiration of the rest period, broadcasting by the module the generated status packet over the vehicle seat network for receipt by other ones of the plurality of modules for actuating one or more seat devices.

2. The method of claim 1, further comprising:
   generating by the broadcasting module an asynchronous packet;
   determining whether the rest period has expired; and
   in response to determining that the rest period has not expired, broadcasting the asynchronous packet during the rest period.

3. The method of claim 2, wherein a priority assigned to the asynchronous packet is higher than a priority assigned to the heartbeat packet.

4. The method of claim 1, further comprising:
   generating by the broadcasting module a plurality of staggered packets, wherein a priority assigned to a staggered packet is lower than a priority assigned to the heartbeat packet;
   transmitting one or more of the staggered packets over the vehicle network;
   monitoring a timeout period; and
   suspending transmission of the one or more staggered packets in response to reaching a portion of the timeout period.

5. A seat actuation control system for controlling a seat having a plurality of seat devices comprising:
   a plurality of control modules interconnected over a communication bus, each control module associated with a corresponding seat control device and configured to control its corresponding seat device, each control module comprising:
      a processing unit in each control module configured to:
         receive status packet from each of the other control modules over the communication bus without receiving commands from a master controller for actuating the seat device;
         process the status packets for determining an overall system status; and
         actuate the seat device based on the overall system status.

6. The seat actuation control system of claim 5, wherein the processing unit is further configured:
   determine status of the corresponding seat device;
   generate a status packet including the status information; and
   broadcast the status packet to the other control modules over the communication bus.

7. The seat actuation control system of claim 6, wherein each control module comprises a communication interface configured to receive status packets from the other control modules over the communication bus and transmit its status packets to the other control modules over the communication bus.

8. The seat actuation control system of claim 5, wherein each control module comprises an interface coupled in between the processing unit and the corresponding seat device, and wherein the processing unit actuates the seat device with the interface.

9. The seat actuation control system of claim 5, wherein each control module comprises a memory for storing data.

10. The seat actuation control system of claim 5, wherein the plurality of control modules at least include a seat control module configured to control a seat component and an input device.

11. The seat actuation control system of claim 5, wherein processing the status packets further comprises:
 determining whether a message of each of the status packets is intended for the control module receiving the status packets;
 storing a content of the messages in the memory if the messages are intended for the control module; and
 operating the seat device from a current state to a target state.

12. The seat actuation control system of claim 5, wherein the overall system status further comprises a status of the seat control device associated of each of the control modules.

13. The seat actuation control system of claim 5, wherein the status packet further comprises a message header and a message data.

14. The seat actuation control system of claim 13, wherein the message header further comprises:
 a priority of the status packet;
 a format of the message data; and
 a message acknowledge request field.

15. The seat actuation control system of claim 13, wherein the message data further comprises a status of the seat control device associated with the control module sending the status packet.

16. The seat actuation control system of claim 15, wherein the status of the seat control device associated with the control module sending the status packet further comprises a position of the seat control device and a current operational status of the seat control device.

17. The seat actuation control system of claim 5, wherein the processing unit, in being configured to receive the status packet from each of the other control modules over the communication bus, is further configured to:
 receive a first heartbeat packet from a first control module of the plurality of control modules;
 receive a second heartbeat packet from a second control module of the plurality of control modules after receiving the first heartbeat packet.

18. The seat actuation control system of claim 17, wherein the processing unit, in being configured to receive the status packet from each of the other control modules over the communication bus is further configured to receive an asynchronous packet between receiving the first and second heartbeat packets.

19. The seat actuation control system of claim 17, wherein the processing unit, in receiving the status packet from each of the other control modules over the communication bus, is further configured to receive a staggered packet between receiving the first and second heartbeat packets.

20. A system for peer-to-peer communication between a plurality of modules of a vehicle seat network, each module being configured to control a corresponding seat device, the system comprising:
 processor; and
 memory, wherein the memory includes instructions corresponding to one of the plurality of modules, wherein the instructions cause the processor to:
  monitor a transmit sequence for determining whether the module is a next module in the sequence;
  in response to determining that the module is the next module in the transmit sequence, generate a status packet including status information of the corresponding seat device;
  monitor expiration of a rest period; and
  in response to expiration of the rest period, broadcast the generated status packet over the vehicle seat network for receipt by other ones of the plurality of modules for actuating one or more seat devices.

21. The system of claim 20, wherein the instructions further cause the processor to:
 generate an asynchronous packet;
 determine whether the rest period has expired; and
 in response to determining that the rest period has not expired, broadcast the asynchronous packet during the rest period.

22. The system of claim 20, wherein a priority assigned to the asynchronous packet is higher than a priority assigned to the heartbeat packet.

23. The system of claim 20, wherein the instructions further cause the processor to:
 generate a plurality of staggered packets, wherein a priority assigned to a staggered packet is lower than a priority assigned to the heartbeat packet;
 transmit one or more of the staggered packets over the vehicle network;
 monitor a timeout period; and
 suspend transmission of the one or more staggered packets in response to reaching a portion of the timeout period.

* * * * *